US006610792B2

(12) United States Patent
Albe et al.

(10) Patent No.: US 6,610,792 B2
(45) Date of Patent: Aug. 26, 2003

(54) POLYPROPYLENE COPOLYMERS AND METHOD OF PREPARING POLYPROYLENE COPOLYMERS

(75) Inventors: Lisa K. Albe, Ophain-Bois-Seigneur-Isaac (BE); William R. Wheat, Waterloo (BE); Jeff Nairn, Friendswood, TX (US); Scott Cooper, Humble, TX (US); Philippe VanDeurzen, Lennik (BE); Michel Daumerie, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/917,310

(22) Filed: Jul. 26, 2001

(65) Prior Publication Data

US 2003/0069367 A1 Apr. 10, 2003

(51) Int. Cl.$^7$ .................................................. C08F 8/00
(52) U.S. Cl. ..................................... 525/387; 525/333.8
(58) Field of Search .......................................... 525/387

(56) References Cited

U.S. PATENT DOCUMENTS 4,705,818 A * 11/1987 Kawai et al. ............... 523/200
4,707,524 A    11/1987 Ehrig et al. ................. 525/387
5,459,201 A * 10/1995 Shroff et al. ................ 525/197
5,530,073 A *  6/1996 Schoenberg ............. 525/333.8
6,015,854 A    1/2000 McCullough, Jr.

FOREIGN PATENT DOCUMENTS

| EP | 1186618 | 3/2002 |
| WO | WO 96/03444 | 2/1996 |
| WO | 0136502 | 5/2001 |

* cited by examiner

*Primary Examiner*—Bernard Lipman
(74) *Attorney, Agent, or Firm*—Grady K. Bergen; Bradley A. Misley

(57) ABSTRACT

Polypropylene heterophasic copolymers are produced having increased impact strength through the use of controlled rheology techniques by the addition of a peroxide at conditions which increase the deactivation or half life of the peroxide. The increased half life slows down the visbreaking process and allows better dispersion of rubber particles within the polymer. In this way, copolymers having a high melt flow can be prepared while obtaining high impact strength and lower stiffness values, without the need for additional elastomeric modifiers.

15 Claims, 4 Drawing Sheets

Linear Peroxide, normal conditions, 4000x

Cyclic Peroxide, normal conditions, 4000x

Linear Peroxide, cold conditions, 4000x

Cyclic Peroxide, cold conditions, 4000x

US 6,610,792 B2

POLYPROPYLENE COPOLYMERS AND METHOD OF PREPARING POLYPROYLENE COPOLYMERS

TECHNICAL FIELD

The invention relates generally to polypropylene copolymers, and more particularly to polypropylene heterophasic copolymers modified with peroxide to improve the impact strength of such copolymers.

BACKGROUND

Polypropylene heterophasic copolymers are typically made up of three components. These include a polypropylene homopolymer, a rubbery ethylene propylene bipolymer, and a crystalline ethylene-rich ethylene propylene bipolymer. The typical heterophasic morphology of these polymers consists of the rubbery ethylene propylene bipolymer being dispersed as generally spherical domains within the semi-crystalline polypropylene homopolymer matrix.

Polypropylene copolymers are used in a variety of applications and products. In many instances, it is particularly important for the copolymers to have good impact strength characteristics. Polypropylene copolymers can be modified to improve the copolymers impact strength. This can be done through the use of elastomeric modifiers or with peroxides. When using elastomeric modifiers, the elastomeric modifiers are melt blended with the polypropylene copolymer, with the increased elastomer content typically contributing to a higher impact strength. Examples of elastomeric modifiers include ethylene propylene rubber (EPR) and ethylene propylene diene monomer (EPDM) rubber.

The use of peroxides to modify polypropylene polymers is also known. WO-95/11938 discloses a process of modifying copolymers by contacting them with a peroxide compound containing an activated unsaturated group and an acid group in the presence of a polymer reinforcing material, or prior to the addition of a polymer reinforcing material. The primary object of that invention was to modify copolymers in order to introduce an adhesion promoting functional group and to improve their properties. The resulting modified copolymers have improved impact strength, flexural strength, tensile strength and elongation at break, increased melt flow index and the other properties equal to those of the unmodified impact copolymers.

WO-97/49759 discloses a process for enhancing the melt strength of a propylene copolymer by the steps of mixing an initiator with the propylene copolymer at a temperature below the decomposition temperature; and then heating the mixture above the initiator decomposition temperature in order to decompose the initiator before the polymer has melted and in order to react the radicals created by the decomposition with the polymer.

WO-96/03444 discloses a process for modifying copolymers by contacting these with an organic cyclic ketone peroxide. Cyclic ketone peroxides have been found particularly efficient in the modification processes. They have been employed in the degradation of polyolefins, the cross-linking of polyolefins, the dynamic cross-linking of blends of elastomers and thermoplastic polymers, the grafting of monomers onto polymers, or the functionalization of polyolefins. The resulting modified copolymers had a larger melt flow index, a lower weight average molecular weight and a narrower molecular weight distribution than the starting copolymers, while keeping an adequate melt strength.

WO-96/20247 discloses cross-linked polymer compositions of propylene-ethylene copolymer and ethylene-α-olefin copolymer prepared by melting and kneading the constituents in the presence of a radical forming agent, a cross-linking agent and eventually a peroxide inhibitor. These compositions were characterized by a high impact strength and a high flexural modulus.

EP-0,208,330 discloses a propylene polymer composition with increased whitening resistance and increased impact strength, obtained by addition of an ester, in the presence of peroxide, during extrusion.

While the aforementioned methods of modifying polymers are known, new techniques for yielding improved polypropylene heterophasic copolymers with high flow and impact strength are needed.

SUMMARY

A method of preparing controlled rheology heterophasic polypropylene copolymers to increase impact strength of such copolymers is provided. The method comprises introducing a heterophasic polypropylene copolymer into an extruder along with a peroxide. The conditions within the extruder are such that the half life of the peroxide is increased by a factor of at least 2 compared to a half life of the peroxide under a normal extruder condition. The peroxide is allowed to degrade the polypropylene copolymer so that the copolymer obtained has a notched Izod impact strength that is increased by at least 50% compared to the same copolymer extruded with the peroxide under the normal extruder condition.

In one particular embodiment, a heterophasic polypropylene copolymer is prepared by introducing a heterophasic polypropylene copolymer into an extruder along with a peroxide under conditions wherein the temperature within the extruder is from about 150° C. to about 215° C., and wherein the half life of the peroxide is increased by a factor of at least 2 compared to a half life of the peroxide under a normal extruder condition in which the extruder temperature is greater than 215° C. The peroxide is allowed to degrade the polypropylene copolymer so that the copolymer obtained has a notched Izod impact strength that is increased by at least 50% compared to the same copolymer extruded with the peroxide under the normal extruder condition. The degraded polypropylene copolymer has a melt flow index of greater than about 5 g/10 min.

In other specific embodiments, the polypropylene copolymer may have an ethylene content of from about 5 to 20% by weight, and may have an undegraded melt flow index of from about 0.05 g/10 min to about 5 g/10 min. The peroxide used may be a linear peroxide or a cyclic ketone peroxide, and may be introduced along with the copolymer in an amount of from about 0.005 wt % to about 0.5 wt %.

BRIEF DESCRIPTION OF THE FIGURES

For a more complete understanding of the present invention, and the advantages thereof, reference is now made to the following descriptions taken in conjunction with the accompanying figures, in which.

DETAILED DESCRIPTION

Figure 1:
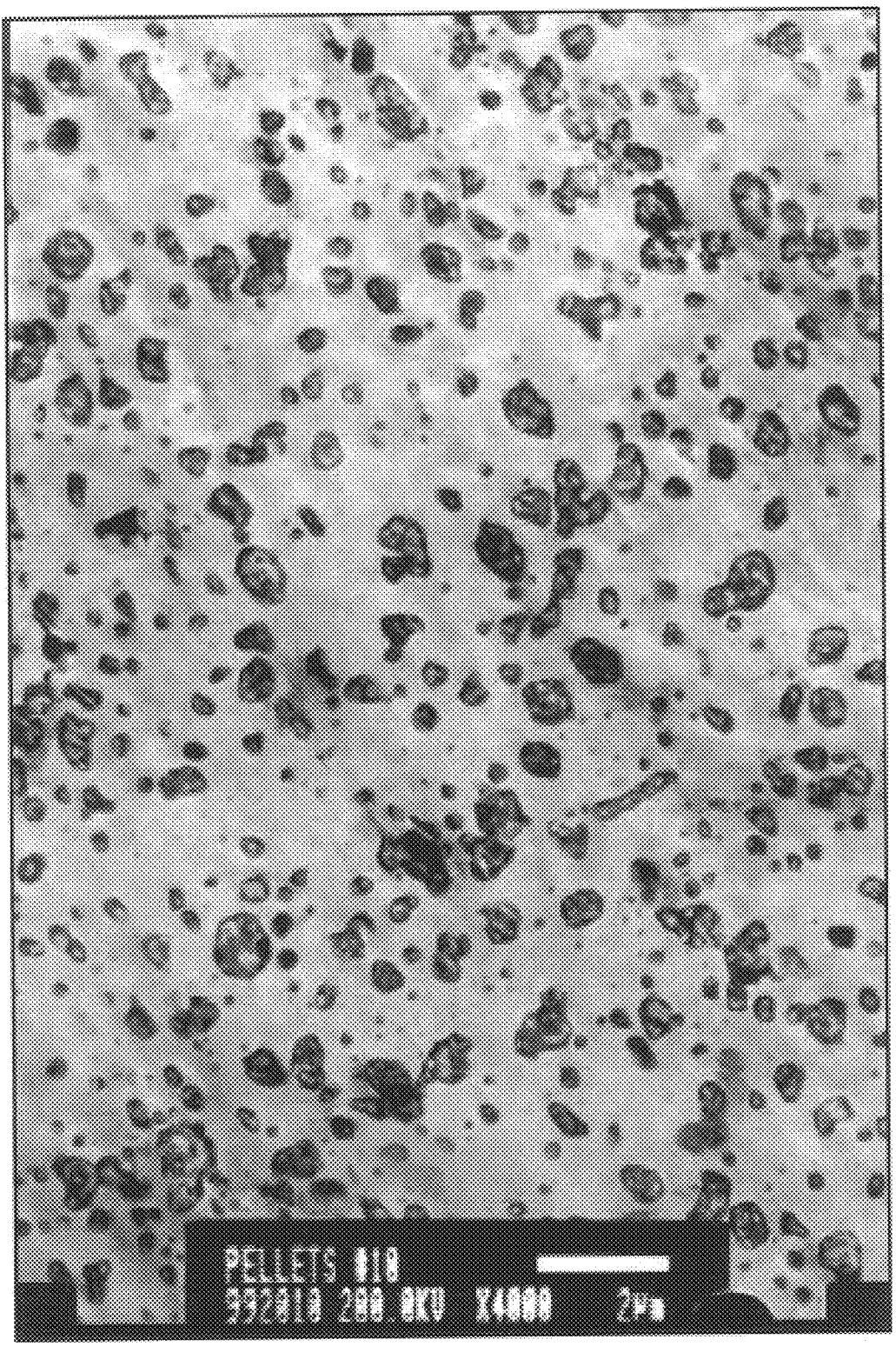
FIG. 1 is a photo of a microscopic sample at 4000× enlargement of a polypropylene heterophasic copolymer extruded under normal conditions utilizing a linear peroxide.

Polypropylene copolymers modified using controlled rheology techniques produces a higher impact polymer with lower stiffness values. The treatment of polypropylene with peroxide generally produces a modified polymer. Peroxide radicals can cause chain scission, resulting in shorter polymer chains, which results in an increase in the melt flow index of the polymer. Such modification also causes a decrease in the flexural modulus versus non-degraded polymer of similar final melt flow index. It has been found, however, that further improvements can be attained in impact strength in polypropylene heterophasic copolymers modified with peroxides during the controlled rheology process by adjusting the conditions under which the controlled rheology is carried out. Specifically, by slowing deactivation of the peroxide, impact copolymers with higher impact strength and lower stiffness values can be attained, while achieving the desired final melt flow characteristics.

This decomposition is typically measured in terms of half-life. The half-life of peroxide is defined as the time required to decompose one half of the peroxide molecules at a given temperature. Less reactive peroxide will therefore have a longer half life than more reactive peroxides.

Slowing decomposition of the peroxide during controlled rheology polymer modification slows down the vis-breaking processes. This allows the polymer fluff to remain at a higher viscosity for longer periods of time during extrusion. It is believed that by maintaining the polymer viscosity at higher levels during extrusion, the rubber phase of the polypropylene copolymer is better dispersed, which in turn results in a higher impact strength for the same polymer modified with peroxide having shorter decomposition times.

The preferred polypropylene heterophasic copolymers are those prepared by copolymerising propylene with ethylene in the amounts of from about 80 to about 95% by weight of propylene and from about 5 to about 20% by weight ethylene. Preferably, the polypropylene copolymer is that prepared using a controlled morphology catalyst that produces ethylene-propylene bipolymer domains dispersed in a semi-crystalline polypropylene matrix. Examples of such catalysts include Ziegler-Natta and metallocene catalysts commonly employed in the polymerization of propylene. The polypropylene copolymers generally consist of three components. These include a propylene homopolymer, a rubbery ethylene-propylene bipolymer and a crystalline ethylene-rich ethylene-propylene bipolymer. The amount and properties of the components are controlled by the process conditions and the physical properties of the resulting material are correlated to the nature and amount of the three components. In the present invention, the preferred amount of ethylene is from about 5% to about 20% by weight, more preferably from about 7 to about 15% by weight, and still more preferably from about 11 to about 14% by weight.

The polymerization reaction may be carried out in a two-reactor configuration in which the catalyst and propylene are charged into a first loop reactor equipped with a circulation pump. Preferred temperatures within the loop reactor are from 60 to 80° C., with pressures ranging from 35 to 40 bars. The liquid propylene monomer is used as a suspension medium. Within the reactor, the propylene homopolymer is produced on the surface of the catalyst particles. The propylene polymer-coated catalyst grains are then transferred to one or more secondary gas-phase reactors with a fluidized bed. Ethylene is added in order produce an ethylene-propylene rubber component.

The resultant polypropylene heterophasic copolymer fluff or powder can then be processed through controlled rheology techniques with the addition of peroxide in accordance with the invention. Additionally, non-modified or partially modified polymer pellets may also be processed in accordance with the invention to achieve similar results.

Modification or degradation of the polypropylene heterophasic copolymer is carried out in an extruder, in which peroxide is added, in order to increase the flow characteristics of the polymer. Additionally, other additives, such as stabilizers, antioxidants, nucleating additives, acid neutralizers, anti-static agents, lubricants, filler materials, etc., which are well known to those skilled in the art, may also be combined with the propylene copolymer within the extruder.

The particular choice of peroxide is not necessarily critical provided it achieves the necessary vis-breaking to produce the desired final propylene copolymer properties. Particularly effective are the linear organic peroxides. Preferred linear peroxides are those represented by the formulae below:

$$R_1\text{—}O\text{—}O\text{—}R_2 \qquad (1)$$

$$R_1\text{—}O\text{—}O\text{—}R_2\text{—}O\text{—}O\text{—}R_3 \qquad (2)$$

where $R_1$–$R_3$ are independently selected from the group consisting of hydrogen, $C_1$–$C_{20}$ alkyl, $C_3$–$C_{20}$ cycloalkyl, $C_6$–$C_{20}$ aryl, $C_7$–$C_{20}$ aralykl, $C_7$–$C_{20}$ alkylaryl, which groups may include linear or branched alkyl moieties; and each $R_1$–$R_3$ may be optionally substituted with one or more groups selected from hydroxy, $C_1$–$C_{20}$ alkoxy, linear or branched $C_1$–$C_{20}$ alkyl, $C_6$–$C_{20}$ aryloxy, halogen, ester carboxy, nitrile and amino.

Preferably, those linear peroxides having at least two peroxide groups are employed, as illustrated in Equation 2 above. One such linear peroxide is 2,5-dimethyl-2,5-di(t-butylperoxy)hexane, which has the structural formula:

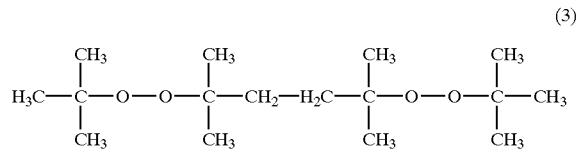

and which is commercially available as LUPEROX 101, from ATOFINA Chemicals, Inc. This peroxide has a level of active oxygen on the order of about 10% by weight. As supplied, the additive is about 92% assay for the active component. The peroxide available as LUPEROX 101 is characterized by a half life ($t_{1/2}$) of about 233 sec. at 160° C.

Other suitable peroxides are the cyclic ketone peroxides, such as those disclosed in WO-96/03444, which is herein incorporated by reference. The preferred cyclic ketone peroxides are those represented by the general formulae:

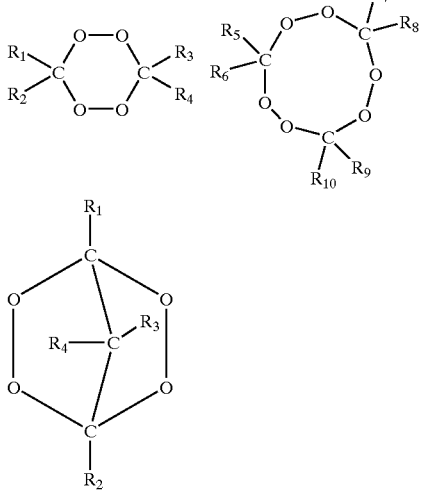

(4)

where $R_1$–$R_{10}$ are independently selected from the group consisting of hydrogen, $C_1$–$C_{20}$ alkyl, $C_3$–$C_{20}$ cycloalkyl, $C_6$–$C_{20}$ aryl, $C_7$–$C_{20}$ aralkyl, $C_7$–$C_{20}$ alkylaryl, which groups may include linear or branched alkyl moieties; and each of $R_1$–$R_{10}$ may be optionally substituted with one or more groups selected from hydroxy, $C_1$–$C_{20}$ alkoxy, linear or branched $C_1$–$C_{20}$ alkyl, $C_6$–$C_{20}$ aryloxy, halogen, ester carboxy, nitrile and amino. The term "ketone peroxide," as used herein, refers to those peroxides derived from either ketones or aldehydes.

The preferred cyclic ketone peroxide is that containing at least two peroxide groups. A suitable cyclic ketone peroxide is 3,6,9-triethyl-3,6,9-trimethyl-1,4,7-triperoxonane, which is commercially available as TRIGONOX 301, available from Also Nobel Chemicals B.V. This latter molecule has three peroxide groups and a relatively small number of carbon atoms and thus a level of active oxygen on the order of about 18% by weight. TRIGONOX 301 is a solution of about 40% of 3,6,9-triethyl-3,6,9-trimethyl-1,4,7-triperoxonane in ISOPAR M diluent and thus has about 7.5% by weight of active oxygen. The cyclic peroxide available as TRIGONOX 301 has a half life of about 889 sec. at 160° C.

The peroxides are typically used in copolymer product in the amount of from about 0.005 wt % to about 0.5 wt %, and more typically from about 0.02 wt % to about 0.15 wt %. Depending on the particular peroxide employed, this amount may vary due to the amount of available active oxygen of the peroxide. The amount of peroxide used will also vary depending upon the amount of vis-breaking desired. This is based upon the initial melt flow of the polymer and the desired final melt flow.

As noted earlier, improvements in impact strength for polypropylene heterophasic copolymers have been observed by slowing the decomposition or increasing the half life of the peroxide during degradation. This is accomplished through a reduction in extrusion temperatures. Alternatively, selection of a peroxide having an increased or longer half life than would otherwise be chosen may also be employed where given extrusion conditions are necessary. Normal extrusion temperatures for most controlled rheology of heterophasic copolymers are usually from about 450° F. to about 550° F., but may be hotter depending upon the product being processed. By significantly reducing these temperatures, improvements in impact strength can be achieved. A significant increase in impact strength can be obtained, as measured by notched Izod testing methods, when extruder temperatures are reduced substantially to thereby increase the half life of the peroxide. Specifically, when temperatures are reduced to increase half life times of the peroxides by about two to about 100 times those half life times obtained under conventional extruder temperatures to achieve the same degree of vis-breaking, a 50% to 200%, or greater, increase in notched Izod impact strength can be obtained for the polypropylene heterophasic copolymers.

The polypropylene heterophasic copolymer is extruded at temperatures to maintain the material in a molten state, but which are reduced from those used in conventional controlled rheology processes. Thus, extrusion temperatures may range anywhere from the minimum temperature to maintain the copolymer in a molten state up to about 215° C., to thereby increase the deactivation of the peroxide employed. When such temperatures are employed, at least some amount of the peroxide will usually remain unconsumed within the extruded copolymer. Typically, the temperatures will range from about 150° C. to about 215° C., with from about 160° C. to about 190° C. being preferred.

The melt flow index of the initial polypropylene heterophasic copolymer fluff or powder is typically from about 0.05 g/10 min to about 5 g/10 min, more typically from about 0.5 g/10 min to about 5 g/10 min, as determined by ASTM D-1238, Condition L. Unless otherwise indicated, all melt flow indices presented are measured according to ASTM D-1238, Condition L. The final extruded impact copolymer produced according to the present invention will typically have a melt flow index of greater than about 5 g/10 min. The method of the invention has particular application in modifying or degrading those impact copolymers to a final extruded melt flow index of from about 0.5 g/10 min to about 200 g/10 min, with a range of 5 g/10 min to about 60 g/10 min being preferred.

Izod notched impact strengths in the copolymers modified and extruded according to the present invention are greater than 8 ft-lb/in as measured at room temperature.

The copolymers produced in accordance with the present invention have particular application to those products requiring a polymer melt index of greater than about 10 g/10 min, high impact strength, and a high flexural modulus. These products are typically produced by further molding the melted copolymer into a desired shape. Examples of products that can be molded from the high impact copolymers produced in accordance with the present invention include various storage containers, such as crates, yogurt and ice cream containers, storage bins, pails, medical waste containers and thin-walled packaging. Other articles may include suitcases, home and garden articles, automotive components, batteries, and a variety of other articles.

The following examples serve to further illustrate the invention.

EXAMPLE 1

A polypropylene heterophasic copolymer fluff having a melt flow index of 0.9 g/10 min and an ethylene content of 10.4% by weight was used as a starting material. The copolymer was blended with additives in a high intensity mixer prior to extrusion. The additives consisted of 0.10% by weight of a blend of phenolic and phosphite antioxidants; and 0.04% by weight of acid neutralizer. The samples were compounded on a 1 ¼ inch Welex extruder at 150 rpm, and through a 100 mesh screenpack. For comparison, both "hot" and "cold" extruder temperatures were used. The hot extruder temperature profile was roughly 445° F. (230° C.), with the cold extruder temperature profile being roughly 365° F. (185° C.). Both linear and cyclic ketone peroxides were used in the form of LUPEROX 101 and TRIGONOX 301, respectively. Because of differences in active oxygen content between the different peroxides, different amounts were used to provide similar final melt flow indices. The logarithmic degree of vis-breaking (i.e. log(final MF)—log (initial MF)) remained generally constant for each of the peroxide samples. The following Table 1 sets forth the process conditions and results obtained.

TABLE 1

| Sample | 1 | 2 | 3 | 4 |
|---|---|---|---|---|
| Peroxide | LUPER 101 | TRIG 301 | LUPER 101 | TRIG 301 |
| Fluff mf (actual) g/10 min | 0.9 | 0.9 | 0.9 | 0.9 |
| Pellet mf (actual) g/10 min | 18.9 | 16.9 | 18.5 | 17.3 |
| Log (mf final)-log (mf initial) | 1.32 | 1.27 | 1.31 | 1.28 |
| Extruder used; Conditions | 1 ¼" normal conditions | 1 ¼" normal conditions | 1 ¼" cold conditions | 1 ¼" cold conditions |
| Melt Temp. (° F.) | 446 | | | |
| Extruder Pressure (psi) | 316 | 316 | 1001 | 1303 |
| Peroxide Amt. (wt %) | 0.095 | 0.115 | 0.095 | 0.13 |
| Polymer Properties | | | | |
| Ethylene Content (wt. %) | 10.4 | 10.4 | 10.4 | 10.4 |
| Xylene Solubles (wt. %) | 16.2 | 16.2 | 16.2 | 16.2 |
| Notched Izod Impact (ft-lb/in) | 2.2 | 2.0 | 9.8 | 9.1 |
| Flex Mod. (Kpsi) | 119 | 116 | 118 | 113 |

Figure 2:
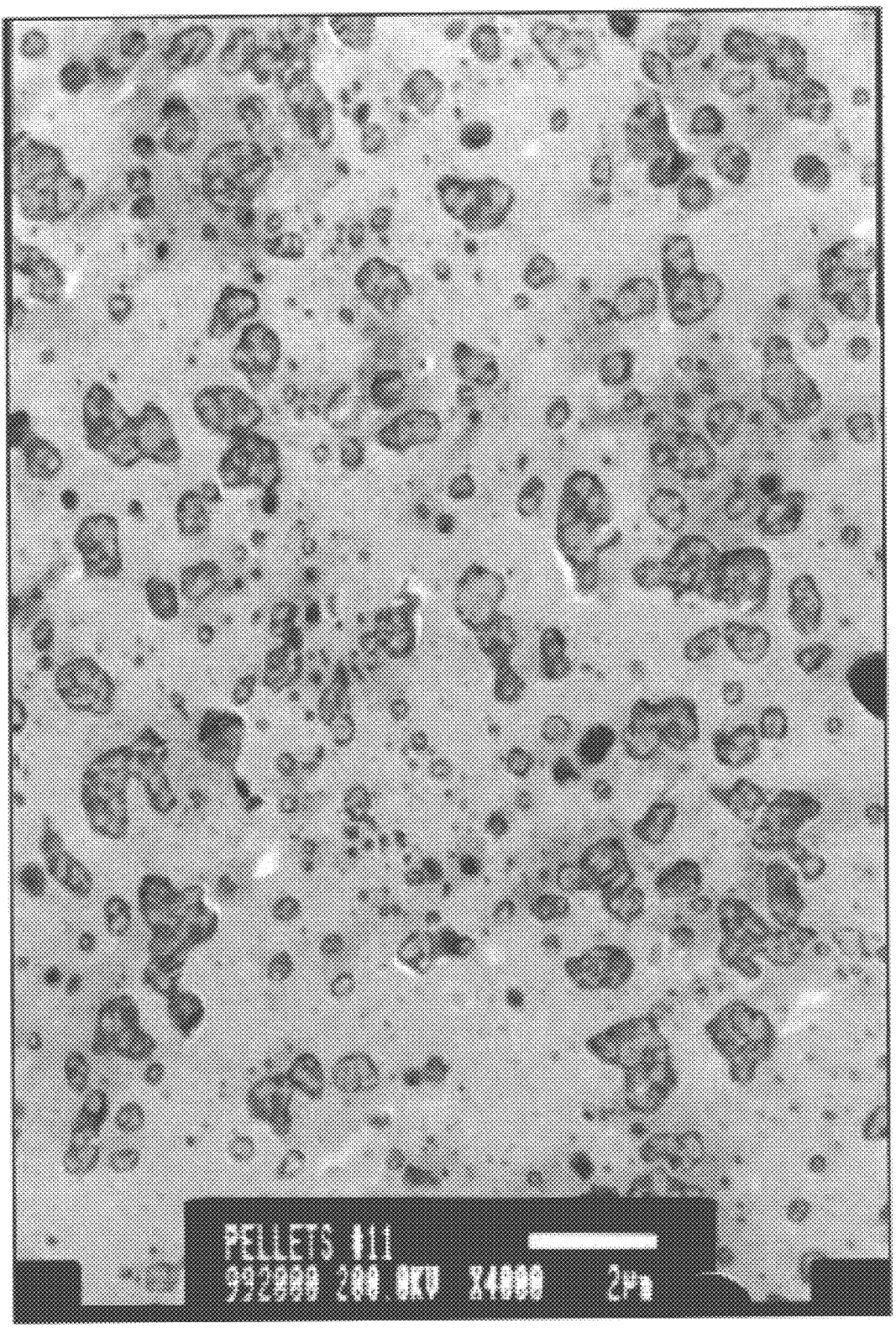
FIG. 2 is a photo of a microscopic sample at 4000× enlargement of a polypropylene heterophasic copolymer extruded under normal conditions utilizing a cyclic ketone peroxide.
Figure 3:
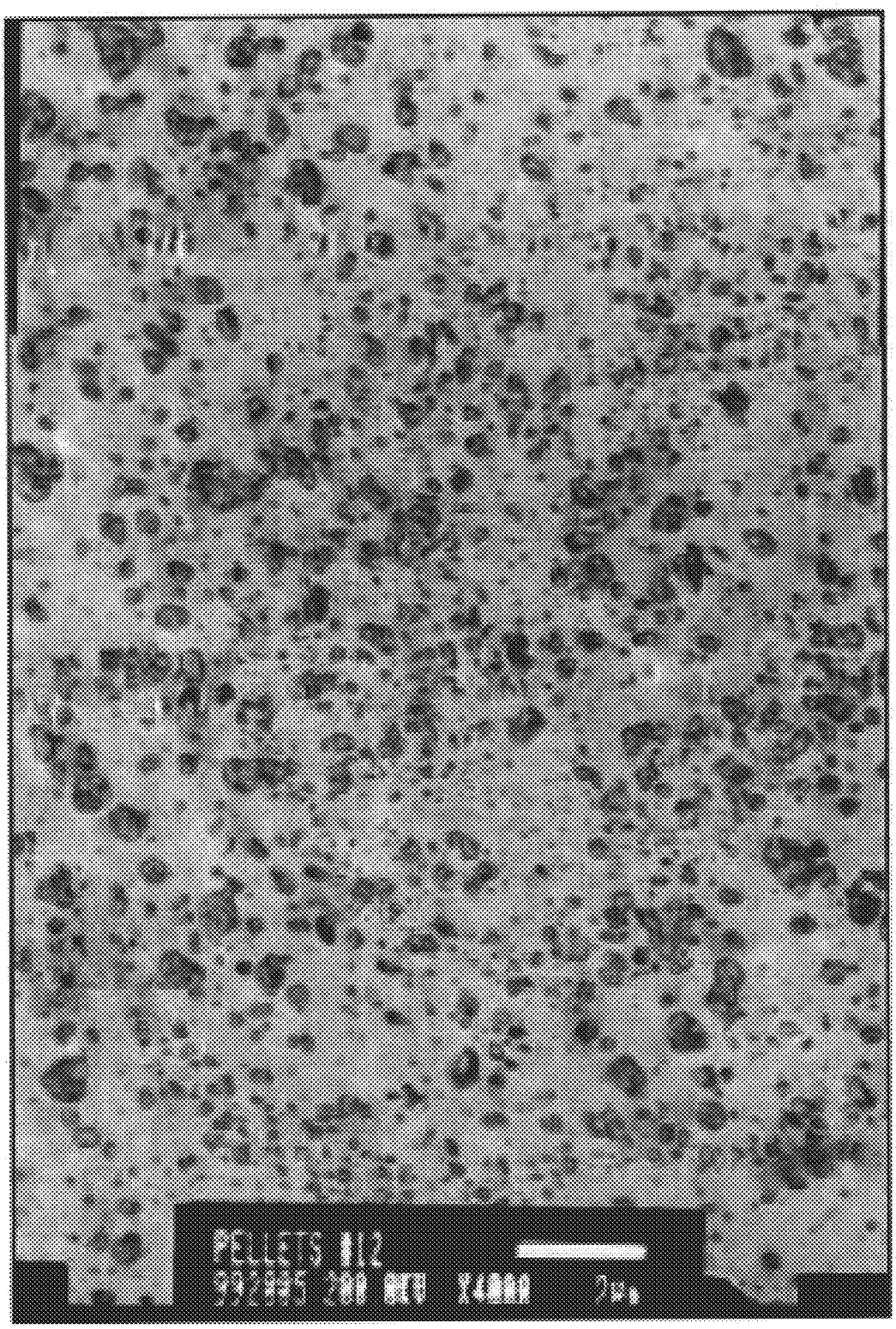
FIG. 3 is a photo of a microscopic sample at 4000× enlargement of a polypropylene heterophasic copolymer extruded under "cold" conditions utilizing a linear peroxide, in accordance with the present invention.
Figure 4:
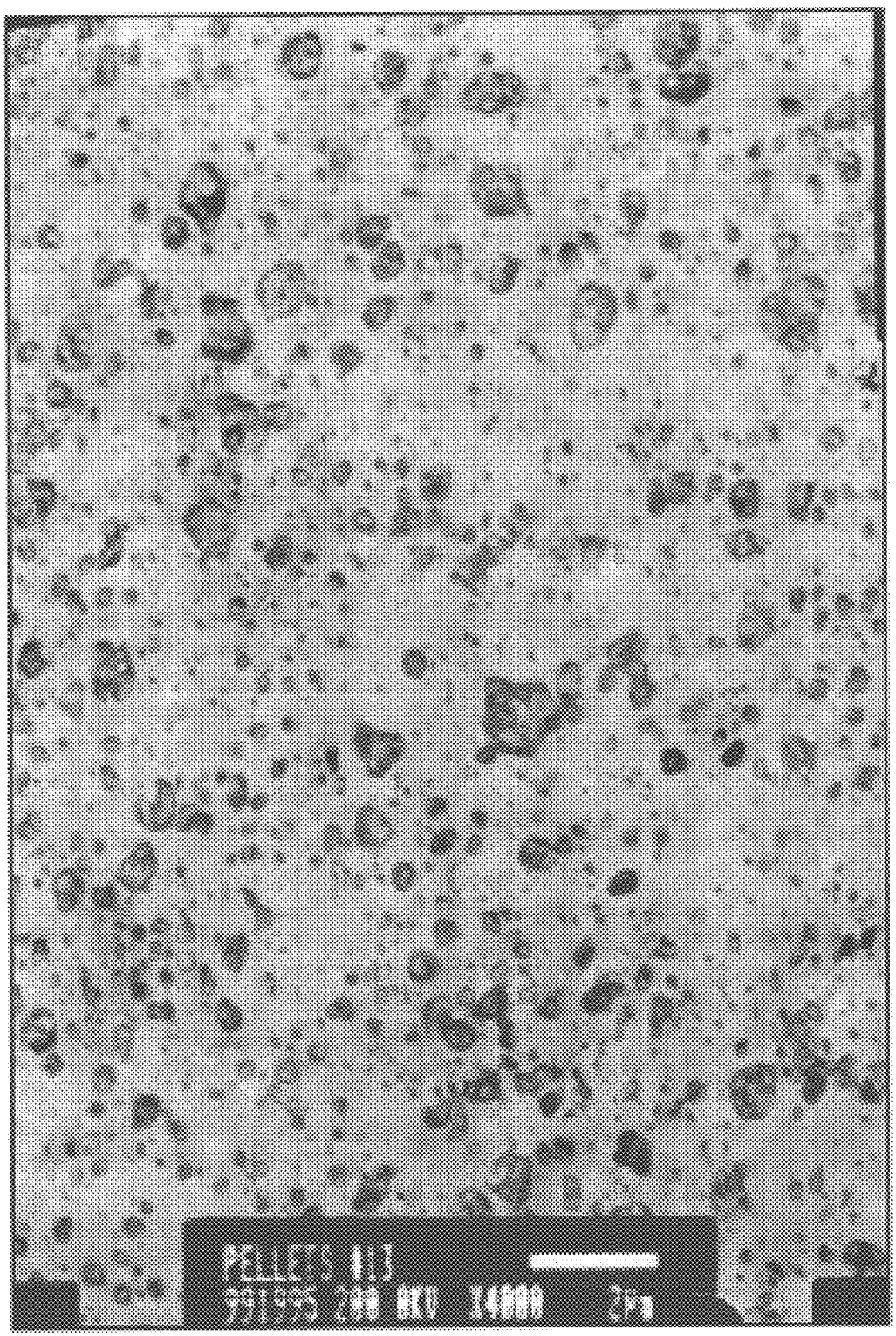
FIG. 4 is a photo of a microscopic sample at 4000× enlargement of a polypropylene heterophasic copolymer extruded under "cold" conditions utilizing a cyclic ketone peroxide, in accordance with the present invention.

The improvement in rubber dispersion within the polymer matrix, which is believed to provide improved impact strength, can best be seen with reference to FIGS. 1–4. FIGS. 1–4 correspond to Samples 1–4, respectively, from Table 1. FIGS. 1–4 show photos of the extruded polymer as seen by a microscope at 4000× enlargement. FIGS. 1 and 2 show the polymer resulting from extrusion under normal or "hot" conditions, while FIGS. 3 and 4 show the polymer extruded under "cold" conditions. As can be seen, the rubber particles in FIGS. 1 and 2 are much larger and are not dispersed as well as the rubber particles of the samples of FIGS. 3 and 4, which were extruded under the "cold" conditions, and which are much smaller and better dispersed.

EXAMPLE 2

The Izod notched impact strength was measured at temperatures of 23, 10 and −20° C. for obtained melt indices of 12, 25 and 40, for extrusion temperatures of 160, 180 and 200° C. for the linear and cyclic ketone peroxides available as LUPEROX 101 and TRIGONOX 301, respectively, using the samples from the same heterophasic impact copolymer starting material. The controlled rheology polypropylene heterophasic copolymer samples were prepared with an ethylene content of 11.3% by weight and had a starting melt flow of approximately 2.0 g/10 min. The results are presented in Table 2, with Izod values measured as kJ/m$^2$.

TABLE 2

| Peroxide | Final Pellet MFI (g/10 min) | Ext. Temp. = 200° C. | | | Ext. Temp. = 180° C. | | | Ext. Temp. = 160° C. | | |
|---|---|---|---|---|---|---|---|---|---|---|
| | | \multicolumn{9}{c}{Impact Test Temp. (° C.)} | | | | | | | | |
| | | 23 | 10 | −20 | 23 | 10 | −20 | 23 | 10 | −20 |
| | | \multicolumn{9}{c}{Izod Values (kJ/m$^2$)} | | | | | | | | |
| Luper. 101 | 12 | 19 | na | 6 | 45* | 13 | 6 | 47* | 13 | 6 |
| Luper. 101 | 25 | 20 | na | 8 | 32** | 10 | 6 | 24** | 10 | 6 |
| Luper. 101 | 40 | 13 | na | 7 | 14 | 8 | 5 | 14 | 9 | 5 |
| Trig. 301 | 12 | 54* | na | 7 | 51* | 43* | 6 | 52* | 42* | 7 |
| Trig. 301 | 25 | 51* | na | 7 | 48* | 13 | 6 | 46* | 13 | 6 |
| Trig. 301 | 40 | 21 | na | 8 | 45* | 11 | 6 | 45* | 11 | 6 | na = not available
* = no break
** = no break in some samples.

It can be seen that by adjusting the conditions during controlled rheology processes, where peroxide is added to degrade the polypropylene heterophasic copolymer, so that the half life time of the peroxide is increased, significant improvements in impact strength of the resulting polymer can be achieved, without the need for additional elastomeric modifiers. The invention has particular application to heterophasic copolymers having high melt flows, i.e. greater than 5 g/10 min, which allows easier and faster processing, while still providing good impact strength and stiffness values. High melt flow polymers with such properties allow shorter cycle times and reduced wall thickness in injection molded articles made with such materials.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of preparing non-filled controlled rheology heterophasic polypropylene copolymers for molded articles comprising introducing a heterophasic polypropylene copolymer into an extruder along with a peroxide under conditions wherein the half life of the peroxide is increased by a factor of at least 2, and allowing the peroxide to degrade the polypropylene copolymer so that the copolymer obtained has a notched Izod impact strength that is increased by at least 50% compared to the same copolymer extruded without said increase in half life while achieving substantially the same degree of vis-breaking.

2. The method of claim 1, wherein:
the extruder temperature is from about 150° C. to about 215° C.

3. The method of claim 1, wherein:
the degraded polypropylene copolymer has a melt flow index greater than about 5 g/10 min.

4. The method of claim 1, wherein:
the undegraded polypropylene copolymer has a melt flow index of from about 0.05 to about 5 g/10 min.

5. The method of claim 1, wherein:
the polypropylene copolymer has an ethylene content of from about 5 to 20% by weight.

6. The method of claim 1, wherein:
the peroxide is 2,5-dimethyl-2,5-di(t-butylperoxy) hexane.

7. The method of claim 1, wherein:
the peroxide is introduced along with the polypropylene copolymer in an amount of from about 0.005 wt % to about 0.5 wt %.

8. The method of claim 1, further comprising:
molding the extruded polypropylene copolymer into a desired article.

9. A method of preparing non-filled controlled rheology heterophasic polypropylene copolymers for molded articles comprising introducing a heterophasic polypropylene copolymer into an extruder along with a peroxide under conditions where the temperature within the extruder is from about 150° C. to about 215° to obtain a copolymer having an increase of from 50% or greater in notched Izod impact strength compared to the same copolymer degraded with the peroxide at temperatures higher than 215° C. while achieving substantially the same degree of vis-breaking.

10. The method of claim 1, wherein:
the peroxide is a linear peroxide.

11. The method of claim 1, wherein:
the half life of the peroxide is increased by a factor ranging from 2 to 100.

12. A method of preparing non-filled controlled rheology heterophasic polypropylene copolymers for molded articles comprising introducing a heterophasic polypropylene copolymer having an ethylene content of from 5 to 20% by weight of polymer and a melt flow index of from about 0.05 to about 5 g/10 min into an extruder along with a peroxide under conditions wherein the half life of the peroxide is increased by a factor of at least 2, and allowing the peroxide to degrade the polypropylene copolymer to obtain a copolymer having an increase of from 50% or greater in notched Izod impact strength without said increase in half life while achieving substantially the same degree of vis-breaking.

13. The method of claim 12, wherein:
the peroxide is a linear peroxide.

14. The method of claim 12, wherein:
the extruder temperature is from about 150° C. to about 215° C.

15. The method of claim 12, wherein:
the peroxide is 2,5-dimethyl-2,5-di(t-butylperoxy) hexane.

* * * * *